(No Model.) W. L. McNAIR. 4 Sheets—Sheet 2.
REVERBERATORY GAS FURNACE.
No. 296,033. Patented Apr. 1, 1884.

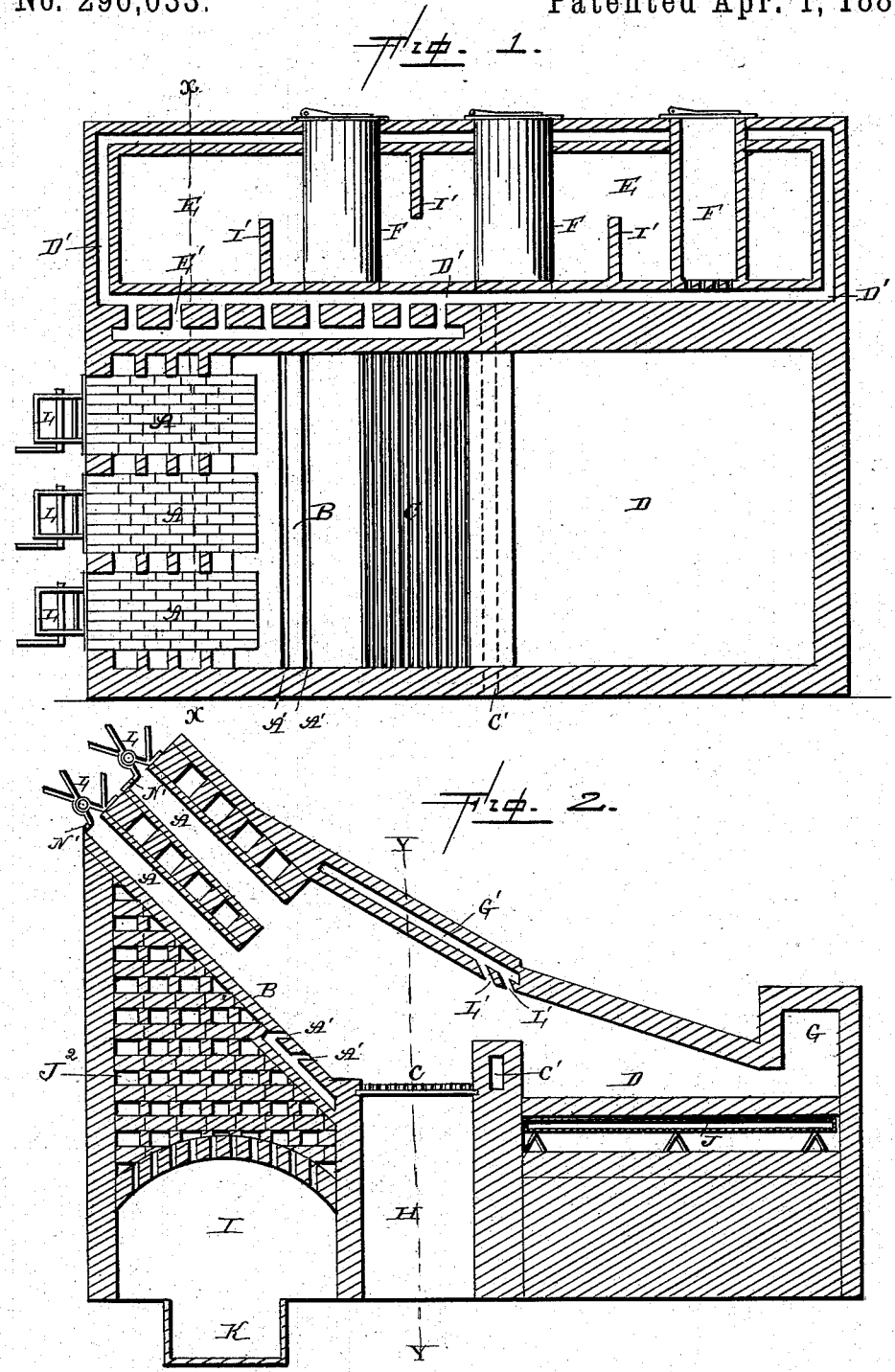

Witnesses.
Louis F. Gardner
J. W. Garner

Inventor.
W. L. McNair
per
J. A. Lehmann,
Atty.

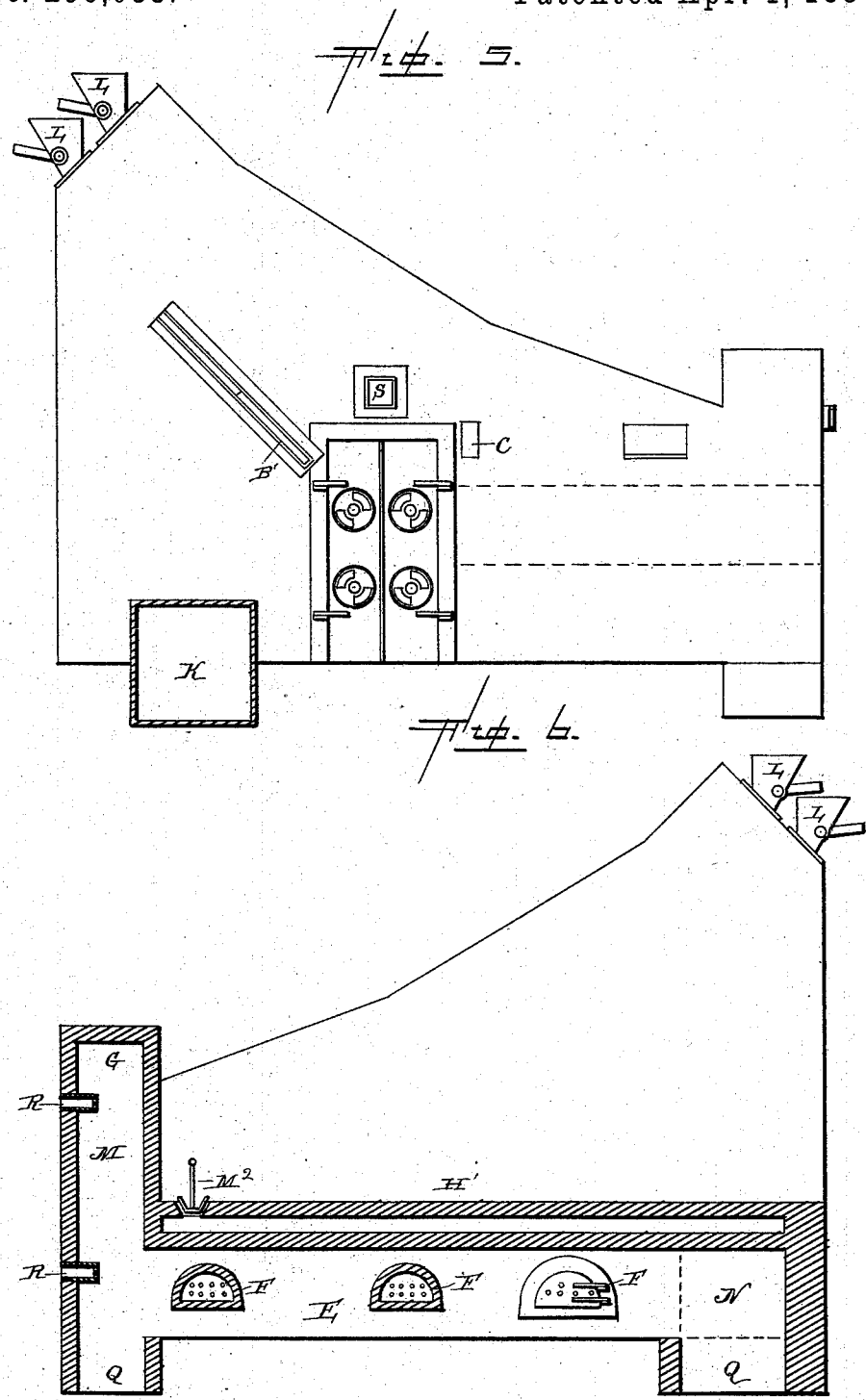

(No Model.)  4 Sheets—Sheet 4.
W. L. McNAIR.
REVERBERATORY GAS FURNACE.
No. 296,033. Patented Apr. 1, 1884.
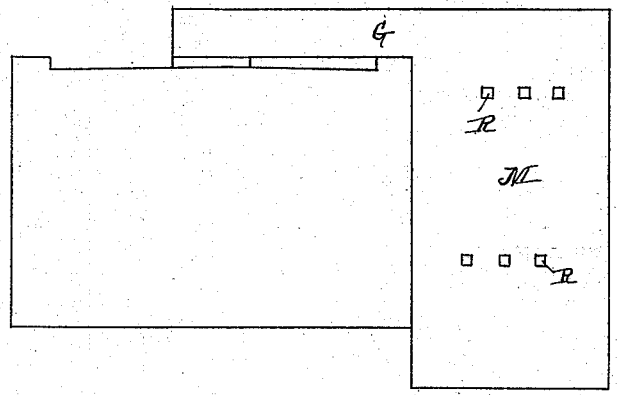
Witnesses.
Louis F. Gardner
J W Gardner
Inventor.
W. L. McNair
per
F. A. Lehmann, Atty.

UNITED STATES PATENT OFFICE.

WILLIAM L. McNAIR, OF GOLDEN, COLORADO.

REVERBERATORY GAS-FURNACE.

SPECIFICATION forming part of Letters Patent No. 296,033, dated April 1, 1884.

Application filed July 25, 1883. (No model.) Patented in Canada November 2, 1883, No. 18,015, and in England November 27, 1883, No. 5,551.

*To all whom it may concern:*

Be it known that I, WILLIAM L. MCNAIR, of Golden, in the county of Jefferson and State of Colorado, have invented certain new and useful Improvements in Reverberatory Gas-Furnaces; and I do hereby declare the following to be a full, clear, and exact description of the invention, such as will enable others skilled in the art to which it pertains to make and use it, reference being had to the accompanying drawings, which form part of this specification.

My invention relates to an improvement in reverberatory gas-furnaces; and it consists, first, in the combination of a series of muffles, an incline which extends from the inner end of the muffles down to or nearly to the grate, the air-flues, which are made through this incline, the grate, and the reduction-flues; second, the combination of the muffles, the grate, the hearth, the heating-chamber through which the retorts pass, the air-flue in which the air is heated, the valve which controls the admission of the air, the hollow bridge-wall, and a means for regulating the admission of the air to the bridge-wall, all of which will be more fully described hereinafter.

Figure 3:
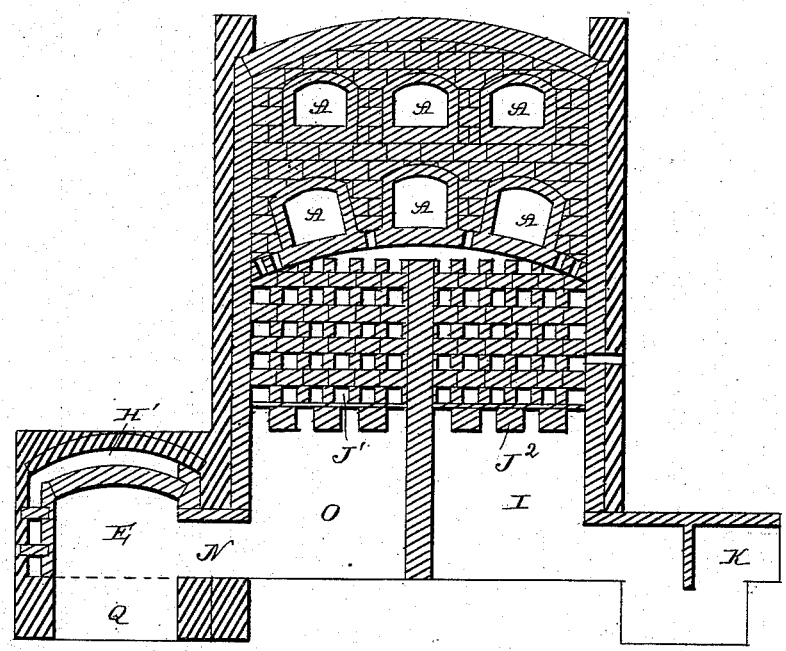
Figure 4:
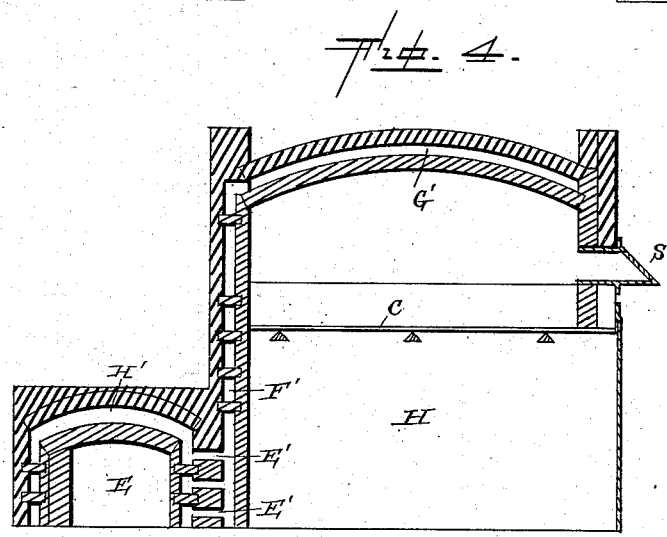

Figure 1 is a plan view of my furnace with the top removed. Fig. 2 is a vertical longitudinal section of the furnace. Figs. 3 and 4 are vertical sections of the furnace, taken upon the lines X X and Y Y. Fig. 5 is a side elevation of the furnace. Fig. 6 is a side elevation from the opposite side of the furnace, the flues being shown in section. Fig. 7 is a view of the rear end of the furnace.

In the front of the furnace are placed a suitable number of muffles, A, which are built in sections or of brick, and into which the fuel is charged before it is fed to the grate C. The muffles having been heated from the fire and waste products of combustion on the grate C, the whole is charged into the muffles through the hoppers L and soon becomes thoroughly distilled. The coke is then shoved forward upon the inclined plane B and grate C until it is banked above the inner end of the upper muffles. All of the volatile matter is distilled from the coal in the muffles A, and instead of being allowed to escape freely it is made to pass through the heated mass of coke on the incline B and grate C. Bituminous or soft coal is preferably used. Through the side of the wall of the furnace is made an opening, B', which can be controlled by means of a suitable slide. Through this opening the air passes into the chamber which extends across under the lower end of the inclined plane B, and from which chamber the air escapes through the flues A', (shown in Figs. 1 and 2,) through the body of the coke. Either air or steam may be passed into the chamber through the flues A' under the mass of heated coke, so as to form, with the coke, carbonic oxide and hydrogen in the proportions desired. The hoppers L have the small openings N' made through them, so that air or steam can pass into the heated muffles, as may be desired. The ash-pit H under the grate C is provided with doors at one end, as shown at Fig. 5, and these doors are provided with suitable registers, so as to regulate the draft. The fire in the first instance is made through the stoking-holes S in the usual manner. The hearth D, which is separated from the grate by the usual bridge-wall, has the water-chamber J placed under or formed in it, and through which the water is made to circulate in any suitable manner.

In smelting oxides in a reverberatory furnace, it is sometimes very difficult to keep the bottom in the furnace, owing to the basic nature of the charge and the dissolving of the silicate of the material composing the bottom. Where water is kept constantly circulating through the chamber J, the temperature of the material composing the bottom is kept at the point below which the oxide in the charge will dissolve it. The products of combustion pass upward from the rear end of the hearth, through the flue G, down through the flue M, into the flue E, forward to the front end of the furnace, through the flue N into the chamber O, up through the checkered brickwork J, around the muffles A, down through the brick-work J', into the chamber I, and thence on out through the flue K to the stack, which may be located at any convenient point.

The brick-work J and J' absorbs a large amount of the waste heat, and retains it for the purpose of keeping the muffles heated, so as to thoroughly distill all of the volatile matter contained in the fuel. In the flues, at suitable points, are placed the pits Q, and in the flue E are placed the walls or other suitable obstructions, I', which tend to cause eddies in the escaping products of combustion, and thus cause them to deposit particles which would be carried off from the hearth D.

Passing horizontally through the flue E are a suitable number of muffles, F, which are perforated at their inner ends, so as to communicate through the doors which are applied to their outer ends. These muffles are intended to receive charges of ore, for the purpose of oxidizing or deoxidizing them.

When it is intended to deoxidize iron ores for the purpose of making blooms or metal sponge for the open-hearth steel process, the pulverized ore is mixed with any carbonaceous material or deoxidizing agent and charged into the heating-muffles, and the doors are then closed. When the charge is deoxidized, it is withdrawn and charged into the hearth D, when it is heated to the welding-point. The charge is then withdrawn from the hearth and placed under the hammer and converted into a bloom, or melted for steel in the usual manner. Should it be desired to oxidize the ore, the charge is placed in the muffles and currents of air are allowed to pass through them, escaping by the flue D' to the furnace. Through the side of the furnace, and passing through the bridge-wall, is the flue C', which connects at its inner end with the flue D', as shown in Fig. 1. This flue D' is made all around the flue E, and the air in the flue D' is heated, not only while passing through the bridge-wall, but while in the flue D', by the waste products of combustion. The heated air passes from the flue D' through the short horizontal flues E into the vertical flue F', (shown in Fig. 4,) thence into the flue G', over the top of the grate, and then passes through the ports L', so as to mingle with the gases as they pass over the bridge-wall. This heated air furnishes oxygen to the gases for the purpose of causing a perfect combustion and an intense heat upon the hearth D. Also passing through the rear end of the furnace into the flue M are a series of ports, R, through which the air passes, for the purpose of mingling with the products of combustion, so as to cause an intense heat in the flue E, and thus heat the muffles F. These ports R and the short flues E' are provided with pipes which are perforated at their inner ends, so that the air will become more thoroughly heated in passing through the pipes, and will be sprayed or discharged in fine particles. Also made through the top of the brick-work over the flue E is an air-flue, H', which has its air-supply controlled by the valve $M^2$, as shown in Fig. 6.

When it is desired to have but a low heat in the furnace D and an intense heat in the flue E, the valve $M^2$ will be closed, so as to shut off the supply of air to the flue H', and the openings C' (shown in Fig. 5) will also be closed. No air will then be fed to the gases as they pass over the bridge-wall, and hence only a reducing or deoxidizing flame is produced in the hearth D. A carbonic-oxide flame is the result, giving but a low temperature in the hearth, while an intense heat is produced in the flue. When the products of combustion leave the flue G, they are met by the currents of air through the flues R E', where they are turned to carbonic acid.

The muffles are built of ordinary brick-work, and then before the inclosing-walls are built around them they are washed with a coat of red lead mixed with either water or oil. This red lead penetrates the pores of the bricks, and then when heat is applied a small portion the bricks melts and mingles with the lead. This slag runs into the joints and makes them perfectly gas and air tight. Salt and clay may be used for the same purpose. The usual method of constructing the muffles involves much more trouble and expense in making them and then burning them afterward. Even after the muffle is placed in position, if the heat is not uniformly applied, it is apt to break. Where the muffles are made of brick-work and glazed, as above described, the joints expand and the glazing becomes elastic under the heat and expands with them.

My invention differs from other furnaces heretofore made in having the muffles so constructed that the coke can be made to cover their inner ends, and in having air-flues to admit air under the coke, so as to pass up through it. It also differs in the combination and arrangement of parts, whereby but a low heat is kept in the hearth D and an intense heat in the flue.

Having thus described my invention, I claim—

1. In a furnace, the combination of a series of inclined muffles, A, the incline B, provided with suitable air-openings, grate C, hearth D, and the heating-chamber E, provided with retorts, substantially as described.

2. In a furnace, the combination of the muffles A, the incline B, provided with openings A', grate C, hearth D, the heating-chamber E, provided with the retorts, flues D' F', valve $M^2$, hollow bridge-wall C', and a means for regulating the admission of the air thereto, substantially as specified.

3. In a reverberatory furnace, the combination of a series of inclined muffles, A, the plane B, provided with air-openings A', grate C, hollow bridge-wall C', hearth D, flue G, and the heating-chamber E, the bridge-wall being provided with means for regulating the admission of air thereto, substantially as shown.

4. In a reverberatory furnace, the combination of a series of inclined muffles, the incline B, provided with air-openings A', the grate C, hollow bridge-wall provided with means for regulating the admission of air thereto, the hearth D, flue G, heating-chamber E, retorts F, flues D' E' F' G' H', as described, and openings L' above the bridge-wall, and valve M², substantially as described.

In testimony whereof I affix my signature in presence of two witnesses.

WILLIAM L. McNAIR.

Witnesses:
H. L. CLARK,
JOSEPH T. BOYD.